(12) United States Patent
Olsson et al.

(10) Patent No.: US 10,480,948 B2
(45) Date of Patent: Nov. 19, 2019

(54) METHOD AND SYSTEM FOR ESTIMATING A BOUNDARY OF A ROAD

(71) Applicant: VOLVO CAR CORPORATION, Gothenburg (SE)

(72) Inventors: Claes Olsson, Molnlycke (SE); Anders Dahlback, Landvetter (SE); Martin Anders Karlsson, Kungalv (SE)

(73) Assignee: VOLVO CAR CORPORATION, Gothenburg (SE)

( * ) Notice: Subject to any disclaimer, the term of this patent is extended or adjusted under 35 U.S.C. 154(b) by 210 days.

(21) Appl. No.: 15/448,991

(22) Filed: Mar. 3, 2017

(65) Prior Publication Data

US 2017/0261327 A1    Sep. 14, 2017

(30) Foreign Application Priority Data

Mar. 10, 2016    (EP) .................................... 16159536

(51) Int. Cl.
*G01C 21/30* (2006.01)
*G01C 21/00* (2006.01)
(Continued)

(52) U.S. Cl.
CPC .......... *G01C 21/30* (2013.01); *G01C 21/005* (2013.01); *G06K 9/00798* (2013.01); *G08G 1/167* (2013.01)

(58) Field of Classification Search
CPC ...... G01C 21/30; G01C 21/005; G08G 1/167; G06K 9/00798
See application file for complete search history.

(56) References Cited

U.S. PATENT DOCUMENTS 6,038,496 A * 3/2000 Dobler ............... B60T 7/22
                                            250/559.06
6,937,165 B2 * 8/2005 Rogers ............... G08G 1/167
                                            340/961
(Continued)

FOREIGN PATENT DOCUMENTS

EP       1674826 A1   6/2006
EP       2012211 A1   1/2009
WO    2013169153 A1  11/2013

OTHER PUBLICATIONS

European Office Action Dated Jun. 1, 2018, Application No. 16 159 536.8-1203, Applicant Volvo Car Corporation, 6 Pages.
(Continued)

*Primary Examiner* — Sze-Hon Kong
(74) *Attorney, Agent, or Firm* — Brooks Kushman P.C.

(57) ABSTRACT

A method performed by a boundary estimation system for estimating a boundary of a road on which a vehicle is positioned and which comprises at least a first lane marking. The system monitors surroundings of the vehicle, detects one or more positions of the at least first lane marking, and approximates a geometrical representation of the at least first lane marking based on one or more of the detected positions of the at least first lane marking. The system further detects one or more positions of a road boundary of the road, approximates a relative lateral offset between the geometrical representation of the at least first lane marking and the detected road boundary, and defines a fictive outer boundary of at least a section of the road based on laterally shifting at least a section of the geometrical representation of the at least first lane marking the relative lateral offset.

15 Claims, 10 Drawing Sheets

(51) Int. Cl.
*G06K 9/00* (2006.01)
*G08G 1/16* (2006.01)

(56) References Cited

U.S. PATENT DOCUMENTS

| | | | | |
|---|---|---|---|---|
| 8,411,900 B2* | 4/2013 | Naka | | G06K 9/00208 |
| | | | | 340/436 |
| 9,283,958 B2* | 3/2016 | Ulbricht | | G08G 1/167 |
| 2007/0274566 A1* | 11/2007 | Fujimoto | | G06K 9/00369 |
| | | | | 382/103 |
| 2010/0259617 A1* | 10/2010 | Kawasaki | | G06K 9/00798 |
| | | | | 348/148 |
| 2012/0069185 A1* | 3/2012 | Stein | | G06K 9/00798 |
| | | | | 348/148 |
| 2012/0288154 A1* | 11/2012 | Shima | | G08G 1/167 |
| | | | | 382/103 |
| 2013/0274959 A1* | 10/2013 | Igarashi | | G08G 1/096844 |
| | | | | 701/1 |
| 2014/0160244 A1* | 6/2014 | Berberian | | G06K 9/00798 |
| | | | | 348/46 |
| 2014/0161323 A1* | 6/2014 | Livyatan | | G06T 3/0093 |
| | | | | 382/107 |
| 2014/0257659 A1* | 9/2014 | Dariush | | G08G 1/166 |
| | | | | 701/70 |
| 2014/0379166 A1* | 12/2014 | Kaneko | | G08G 1/167 |
| | | | | 701/1 |
| 2015/0165972 A1* | 6/2015 | Takemae | | G06K 9/00805 |
| | | | | 348/148 |
| 2015/0332114 A1* | 11/2015 | Springer | | G06K 9/4604 |
| | | | | 348/148 |
| 2015/0363668 A1* | 12/2015 | Kato | | G06K 9/00798 |
| | | | | 382/104 |
| 2016/0012300 A1* | 1/2016 | Tsuruta | | G06K 9/00798 |
| | | | | 382/104 |
| 2016/0042236 A1* | 2/2016 | Ishimaru | | G06K 9/00798 |
| | | | | 382/104 |
| 2016/0091325 A1* | 3/2016 | Takamatsu | | B60W 30/12 |
| | | | | 701/408 |
| 2016/0131762 A1* | 5/2016 | Kim | | G05D 1/024 |
| | | | | 701/23 |
| 2016/0152266 A1* | 6/2016 | Choi | | B62D 15/025 |
| | | | | 701/41 |
| 2017/0008521 A1* | 1/2017 | Braunstein | | G01C 21/32 |
| 2017/0101094 A1* | 4/2017 | Fiaschetti | | B60W 30/12 |
| 2017/0177951 A1* | 6/2017 | Yang | | G06K 9/00798 |
| 2017/0274898 A1* | 9/2017 | Nakamura | | B60W 30/12 |
| 2018/0170429 A1* | 6/2018 | Shimizu | | B62D 6/00 |
| 2018/0197414 A1* | 7/2018 | Oooka | | G08G 1/167 |
| 2018/0257647 A1* | 9/2018 | Jurca | | G01S 7/415 |
| 2018/0286247 A1* | 10/2018 | Fujita | | G08G 1/163 |
| 2018/0315163 A1* | 11/2018 | Livyatan | | G06T 7/20 |
| 2018/0322787 A1* | 11/2018 | Shimizu | | G08G 1/167 |

OTHER PUBLICATIONS

Extended European Search Report Dated Sep. 15, 2016, Application No. 16159536.8-1803, Applicant Volvo Car Corporation, 5 Pages.

* cited by examiner 10,480,948 B2

METHOD AND SYSTEM FOR ESTIMATING A BOUNDARY OF A ROAD

CROSS-REFERENCE TO RELATED APPLICATIONS

This application claims foreign priority benefits under 35 U.S.C. § 119(a)-(d) to European patent application number EP 16159536.8, filed Mar. 10, 2016, which is incorporated by reference in its entirety.

TECHNICAL FIELD

The present disclosure relates to a boundary estimation system adapted to be on-board a vehicle and a method performed therein, for estimating a boundary of a road on which the vehicle is positioned.

BACKGROUND

Since millions of motor vehicles are travelling along roads around the globe day and night, year around, there is constantly an imminent risk of vehicles running off the road for one reason or another. A road departure may result in body injuries and/or damage to the ego vehicle and/or other vehicles involved. In striving to avoid a vehicle leaving the drivable road surface, motor vehicles may be provided with driver assistance systems. These systems may monitor the surroundings of the vehicle, decide whether an imminent road departure is likely to occur, and may further warn and/or intervene with the steering system and/or the brake system of the vehicle in order to prevent the impending or probable road departure. To assess an imminent risk of a vehicle running off the road, information about the vehicle's position in relation to a road boundary of said road, as well as the shape—i.e., the geometry—of the road boundary, may be desired to be determined. To detect and estimate this information, one or more sensors on-board the vehicle may be utilized, such as one or more cameras. For one reason or another, however, the quality of the road boundary detection and/or estimation may be inherently limited, for instance due to insignificant contrast between the drivable surface and the area outside the drivable surface, and/or due to irregularities of the road boundary. Furthermore, darkness, specific road conditions, etc., could worsen the problem. The effect may be noise and/or uncertainties in the information about the vehicle's position and/or orientation in relation to the road in the estimated geometry of the road boundary. These uncertainties may negatively impact the precision in the assessment of the risk of an imminent road departure. Moreover, the possibility to accurately and comfortably provide automatic control of the vehicle for preventing said vehicle from leaving the drivable road surface, may be negatively affected as a consequence of these uncertainties. Accordingly, to provide an approach for preventing a vehicle from running into and/or cross a road boundary, with high availability and satisfying performance, it is desired to enhance the quality of the road boundary information.

EP 2 012 211, for instance, is set out to—among other things—provide an improved surrounding monitoring system, and accordingly discloses a surrounding monitoring system which includes a radar being arranged to detect a road boundary. Since the detected road boundary does not form a continuous line but rather a large set of detected objects forming an uneven interrupted border, EP 2 012 211 suggests to form a continuous line that estimates the road boundary by determining a shape of a shoulder edge thereof, as commonly known in the art. There is further disclosed that a lateral position of the shoulder edge is determined, and subsequently, that an intervention is generated based on a relative lateral position of the vehicle to the shoulder edge. However, although EP 2 012 211 suggests utilizing a radar for improved quality of the road boundary information, and furthermore subsequently supports preventing an impending or probable road departure in an improved manner, there is still room for alternative approaches to obtain enhanced quality of road boundary information.

SUMMARY

It is therefore an object of embodiments herein to provide an alternative approach of estimating a road boundary. According to a first aspect of embodiments herein, the object is achieved by a method performed by a boundary estimation system on-board a vehicle for estimating a boundary of a road on which the vehicle is positioned. The road comprises at least a first lane marking arranged to form a straight and/or curved intermittent or continuous line on a road surface along the road. The boundary estimation system monitors the surroundings of the vehicle. The boundary estimation system furthermore detects one or more positions of the at least first lane marking, and approximates a geometrical representation of the at least first lane marking based on one or more of the positions of the at least first lane marking. Moreover, the boundary estimation system detects one or more positions of a road boundary of the road. The boundary estimation system further approximates a relative lateral offset between the geometrical representation of the at least first lane marking and the detected road boundary, and subsequently defines a fictive outer boundary of at least a section of the road, based on laterally shifting at least a section of the geometrical representation of the at least first lane marking, the relative lateral offset.

Thereby, an approach is provided which enables for approximating—in view of a vehicle—a boundary of a road constraining, e.g., laterally, a road surface considered drivable. That is, since the surroundings of the vehicle are monitored, the environment surrounding the vehicle—such as the road, road markings and/or road edges—is sensed, and information and/or an image thereof may be retrieved. Furthermore, since one or more positions of the at least first lane marking are detected, one or more longitudinal and corresponding lateral positions of one or more lane markings are located. Further, since a geometrical representation of the at least first lane marking then is approximated based on one or more of the detected positions of the at least first lane marking, a mathematical function describing an approximation of the at least first lane marking is provided, derived from the detected one or more longitudinal and corresponding lateral positions thereof. Moreover, since furthermore one or more positions of a road boundary of the road are detected, one or more longitudinal and corresponding lateral positions of a road boundary along the road are located. Since a relative lateral offset between the geometrical representation of the at least first lane marking and the detected road boundary then are approximated, there is estimated a difference in a lateral direction between the approximated geometrical representation of the at least first lane marking and the detected road boundary, valid at, derived from and/or based on a lateral difference at at least one longitudinal position. Moreover, since a fictive outer boundary of at least a section of the road then is defined, based on laterally shifting the geometrical representation of the at least first lane marking, the relative lateral offset, there is provided an approximation of an outer boundary of the road which is represented by a replica of the geometrical representation of the at least first lane marking, positioned offset in a lateral direction by—and/or based on—the value of the relative lateral offset. Thereby, a shape of the geometrical representation of the at least first lane marking is utilized to estimate a—laterally shifted—shape of the road boundary. For that reason, an alternative approach of estimating a road boundary is provided. The technical features and corresponding advantages of the above mentioned method will be discussed in further detail in the following.

By introducing a method performed by a boundary estimation system on-board a vehicle for estimating a boundary of a road on which the vehicle is positioned, an approach is provided which enables for approximating—in view of a vehicle—a boundary of a road constraining, e.g., laterally, a road surface considered drivable. The "road" may be any road intended for vehicle driving, and may be of any shape, width and length, and comprise any arbitrary number of lanes, intersections, cross sections etc. The expression "approximating a boundary constraining a road surface considered drivable", may refer to "approximating a boundary representing a limit beyond which driving is—and/or is deemed—inappropriate and/or not possible". Furthermore, the expression "estimating" a boundary of a road, may refer to "determining", "approximating", "calculating" and/or "providing" a boundary of the road. Moreover, the expression "road on which the vehicle is positioned", may refer to "road along which the vehicle is driving". "Vehicle" may refer to any arbitrary vehicle, for instance an engine-propelled vehicle such as e.g., a car, truck, lorry, van, bus, tractor, military vehicle, etc. The vehicle may furthermore be represented by a vehicle supporting partially autonomous, semi-autonomous and/or fully autonomous driving. The concept of autonomous driving relates to that the vehicle, at least to some extent, is driven without human interaction. When having an automation level anywhere between 0% and 100%, the vehicle may autonomously perform some actions, as e.g., keeping a suitable distance to the vehicle ahead, while the driver may perform other actions, as e.g., overtaking another vehicle when appropriate.

Furthermore, the "boundary estimation system" may at least partly be comprised in and/or be integrated with the vehicle, and further for instance be distributed between different nodes, such as distributed between one or more ECUs ("Electronic control modules"). Additionally or alternatively, the boundary estimation system may at least partly be comprised in a mobile device, which mobile device for instance may refer to a multi-functional smart phone, mobile phone, mobile terminal or wireless terminal, portable computer such as a laptop, PDA or tablet computer, tablet such as an iPad, Pocket PC, and/or mobile navigation device. Said optional mobile device, which may be carried on-board the vehicle and/or be attached thereto, may then further be adapted to communicate with the vehicle on which it may be carried and/or mounted. The expression of the mobile device being adapted to "communicate with the vehicle", may refer to the mobile device being configured to be in communication with the vehicle, such that information and/or data may be transferred there between. Such communication may for instance be accomplished physically, such as via USB connection, and/or wirelessly, such as via Bluetooth, WiFi, or the like. Said expression may further refer to the mobile device being adapted to be "paired" and/or adapted to "be in connection" with the vehicle. Possibly, in order to be paired, identification of the mobile device may be necessary, and/or authentication of the vehicle occupant, e.g., the driver.

Since the road comprises at least a first lane marking arranged to form a straight and/or curved intermittent or continuous line on a road surface along the road, there is provided that one or more commonly known road markings are distributed along the road. The expression "lane marking" is throughout this disclosure intended to refer to a set of one or more lane markers which together form a straight and/or curved intermittent or continuous line on the ground of the road. Accordingly, a first lane marking may for instance be represented by a plurality of lane markers arranged to form a straight and/or curved intermittent or continuous line on the road surface on the right-hand side of the road. Additionally or alternatively, a second lane marking may for instance be represented by a plurality of lane markers arranged to form a straight and/or curved intermittent or continuous line on the road surface between two adjacent lanes. In a similar manner, a third lane marking may for instance represent a center line of the road. The lane marking being arranged "on" a road surface may according to an example refer to the lane marking being arranged "essentially on" a road surface, thus including a lane marking being comprised in—and/or even below—the road surface. Such a lane marking may for instance refer to one or more magnets, e.g., ferret magnets, arranged to form a straight and/or curved intermittent or continuous line; a vehicle equipped with magnetic sensors may then be able to sense said magnets. More common however, is a visual two-dimensional and/or essentially two-dimensional lane marking, e.g., being represented by paint such as white and/or yellow paint, provided, marked and/or painted on the road surface. Length, width, shape etc. of a lane marking may vary, as well as a distance to a second, e.g., parallel, lane marking. Similarly, length, width, shape etc. of a lane marker may vary, as well as distances and relations between lane markers. "Lane marking" may refer to "road marking", whereas "lane marker" may refer to "road marker".

Since the boundary estimation system monitors the surroundings of the vehicle, the environment surrounding the vehicle—such as the road, road markings and/or road edges—is sensed, and information and/or an image thereof may be retrieved as commonly known in the art. The expression "monitoring the surroundings of the vehicle" may refer to "monitoring the surroundings in front of, and/or essentially in front of, the vehicle", and moreover, "monitoring" may refer to "sensing" and/or "observing". Monitoring the surroundings may be accomplished for instance by means of one or more sensors, such as one or more vision sensors, for instance lasers and/or lidars on-board the vehicle—and/or, according to an alternative example—via computer vision. More commonly, however, monitoring the surroundings of the vehicle may comprise monitoring the surroundings of the vehicle by means of one or more cameras on-board the vehicle. The sensor(s)—for instance the camera(s)—may be arbitrarily arranged throughout the vehicle, for instance arranged in a protected position supporting a substantially clear view such that a clear view of the surroundings may be provided, thus for instance behind the windscreen in the vicinity of, or embedded with, a rear view mirror. Moreover, the sensor(s)—for instance the camera(s)—may monitor the surroundings of the vehicle within a field of view, i.e., within a vision zone.

Since the boundary estimation system furthermore detects one or more positions of the at least first lane marking, one or more longitudinal and corresponding lateral positions of one or more lane markings are located, as commonly known in the art. That is, one or more longitudinal and corresponding lateral positions, for instance three such positions, of the at least first lane marking, are detected within the field of view and/or within an image of the field of view. For instance, for determining the position(s) of the at least first lane marking on the road surface, a commonly known Hough transform may be utilized. Which one or more positions—$x_n, y_{Ln}$—to detect, interpret and/or derive, may be arbitrarily selected as known in the art; merely as an example, positions $x_1, y_{L1}$, $x_4, y_{L4}$, $x_6, y_{L6}$ may for instance be selected. An x-axis, which may refer to a longitudinal direction, may as commonly known originate in a current position of the vehicle, and may furthermore extend in a running direction thereof. The y-axis, which may refer to a lateral direction, is naturally perpendicular to the x-axis. Additionally or alternatively, the x-axis may run in a direction of the road and/or the lane markings. As a relative angle between the road surface and an optical axis of the one or more exemplifying cameras on-board the vehicle decreases with the distance from the vehicle, the contrast between the lane marking—and/or the lane markers constituting the lane marking—and the road surface, decreases as well. The lane marking may therefore only be detected within a relatively small field of view, commonly extending approximately 20-50 meters ahead from the vehicle. "Detecting" may throughout this disclosure refer to "locating", "determining", "identifying", "interpreting" and/or "deriving". Moreover, "positions" may throughout this disclosure refer to "geographical positions" and/or "locations", and furthermore to "longitudinal positions and corresponding lateral positions".

Since the boundary estimation system further approximates a geometrical representation of the at least first lane marking based on one or more of the detected positions of the at least first lane marking, a mathematical function describing an approximation of the at least first lane marking is provided as commonly known in the art, derived from the detected one or more longitudinal and corresponding lateral positions thereof. Accordingly, an estimate of a lane marking may thus be represented by e.g., a curved and/or straight line, described by e.g., a commonly known polynomial such as $y(x) = C_0 + C_1 * x + C_2 * x^2 + \ldots + C_3 * x^3$. The expression geometrical "representation" may throughout this disclosure refer to geometrical "estimate, function and/or polynomial", whereas "geometrical" may refer to "mathematical" and/or "polynomial". Moreover, "approximating" may throughout this disclosure refer to "determining", "calculating" and/or "estimating", whereas the expression "based on" one or more of the detected positions, may refer to "by calculating based on and/or derived from" one or more of the detected positions.

Since the boundary estimation system furthermore detects one or more positions of a road boundary of the road, one or more longitudinal and corresponding lateral positions of a road boundary along the road are located, as commonly known in the art. That is, one or more longitudinal and corresponding lateral positions, for instance three such positions, of the road boundary, are detected within the field of view and/or within an image of the field of view. For instance, for determining the position(s) of the road boundary, a commonly known Hough transform may be utilized. Which one or more positions—$x_n, y_{Rn}$—to detect, interpret and/or derive, may be arbitrarily selected as known in the art; merely as an example, positions $x_2, y_{R2}$, $x_3, y_{R3}$, $x_5, y_{R5}$ may for instance be selected. The "road boundary" may be represented by any arbitrary boundary or border constraining, delimiting and/or restricting the drivable surface, commonly in a lateral direction of the road and/or road marking(s). The road boundary may thus be represented by one or more of e.g., a road edge, a transition between e.g., asphalt and grass and/or gravel, a barrier, a delimiter, a line of parked vehicles, a curb, a non-drivable road surface or area, etc.

Since the boundary estimation system further approximates a relative lateral offset between the geometrical representation of the at least first lane marking and the detected road boundary, there is estimated a difference in a lateral direction between the approximated geometrical representation of the at least first lane marking and the detected road boundary, valid at, derived from and/or based on a lateral difference at at least one longitudinal position. That is, the approximated relative lateral offset is valid at, derived from and/or based on a lateral delta between one or more lateral positions of the geometrical representation of the at least first lane marking and one or more lateral position of the detected road boundary of the corresponding longitudinal positions. Said at least one longitudinal position may be selected as suitable for the situation and/or conditions at hand. Although a plurality of lateral offsets at different longitudinal positions may be evaluated to approximate the resulting relative lateral offset, it may be noted that the relative lateral offset is represented by a single value offset, rather than plural offsets having different values. Accordingly, the expression "relative lateral offset" may refer to "single value relative lateral offset" and/or "fixed relative lateral offset". Moreover, "lateral" may in this context be considered in view of a longitudinal extension of the geometrical representation of the at least first lane marking. Additionally or alternatively, in view of the lane marking(s) and/or the detected road boundary. According to another example, "lateral" may be considered in view of a running direction of the vehicle.

Since the boundary estimation system furthermore defines a fictive outer boundary of at least a section of the road, based on laterally shifting the geometrical representation of the at least first lane marking, the relative lateral offset, there is provided an approximation of an outer boundary of the road which is represented by a replica of the geometrical representation of the at least first lane marking, positioned offset in a lateral direction by—and/or based on—the value of the relative lateral offset. Thereby, a shape of the geometrical representation of the at least first lane marking is utilized to estimate a—laterally shifted—shape of the road boundary. Accordingly, the geometrical representation of the at least first lane marking and the fictive outer boundary, may be represented by parallel curves offset from each other the magnitude and/or value of the approximated relative lateral offset. Typically, a lane marking is arranged alongside a road boundary, whereby a smoothed shape of the road boundary—i.e., a shape disregarding small irregularities— essentially may coincide with the shape of the lane marking. Detection and estimation of a lane marking is, however, commonly a more trivial task than detection and estimation of a road boundary, and may hence be carried out with higher accuracy, i.e., lower noise levels and/or lower uncertainty. Accordingly, as the fictive outer boundary—in addition to being based on the approximated relative lateral offset—is defined in consideration of the geometrical representation of the at least first lane marking which thus is likely to have a shape similar to the road boundary, an approach is introduced which ameliorate uncertainties associated with estimating a geometry of the road boundary. Subsequently, the quality of road boundary information may be enhanced. "Defining" a fictive outer boundary may refer to "determining", "providing", "estimating", "approximating" and/or "deriving" a fictive outer boundary, whereas "based on" laterally shifting, may refer to "derived from" laterally shifting. Furthermore, the expression "laterally shifting" may refer to "laterally shifting at least a section of", "hypothetically laterally shifting", "moving laterally", and/or "shifting or moving laterally toward the detected road boundary". Moreover, "lateral" may in this context be considered in view of a longitudinal extension of the geometrical representation of the at least first lane marking. According to an alternative example, "lateral" may be considered in view of a running direction of the vehicle. A "parallel" curve—which may be referred to as an "offset" curve—may throughout this disclosure refer to a curve, such as e.g., the fictive outer boundary, "whose points are at a fixed normal distance from a given curve", for instance the fixed relative lateral offset from the geometrical representation of the first lane marking. The expression "fictive outer boundary" may refer to "fictive lateral outer boundary", "fictive outer boundary representing a road boundary", and/or "fictive curved and/or straight line representing a road boundary". The expression "laterally shifting the geometrical representation of the at least first lane marking, the relative lateral offset", may refer to "laterally shifting the geometrical representation of the at least first lane marking, essentially the relative lateral offset". Thereby, the magnitude of the shift may be equal to, or essentially equal to, the relative lateral offset. According to an example, "defining a fictive outer boundary of at least a section of the road, based on laterally shifting the geometrical representation of the at least first lane marking, the relative lateral offset", may comprise "defining a fictive outer boundary of at least a section of the road, such that the fictive outer boundary is a replica of the geometrical representation of the at least first lane marking, positioned offset in a lateral direction based on the relative lateral offset".

Optionally, approximating the relative lateral offset may comprise approximating a relative lateral offset between the geometrical representation of the at least first lane marking and the detected road boundary, derived from one or more detected lateral positions of the road boundary and respective approximated or detected one or more lateral positions of the geometrical representation of the first lane marking having corresponding longitudinal positions. Thereby, there is estimated a difference in a lateral direction between the approximate geometrical representation of the at least first lane marking and the detected road boundary, valid at, derived from and/or based on a lateral difference at at least one longitudinal position coinciding with the detected one or more longitudinal road boundary positions. That is, the at least one longitudinal position hence coincides with at least one of the detected longitudinal positions of the road boundary. Accordingly, merely as an example, a relative lateral offset—$\Delta y_{LR}$—may be valid, derived from and/or based on one or more offsets at the exemplifying detected longitudinal positions $x_2$, $x_3$, $x_5$. The expression "derived from" may in this context refer to "based on".

Moreover, optionally, the boundary estimation system may furthermore approximate a geometrical representation of the road boundary, based on one or more of the detected positions of the road boundary. Approximating the relative lateral offset then comprises approximating a relative lateral offset between the geometrical representation of the at least first lane marking and the detected road boundary represented by the geometrical representation of the road boundary. Thereby, by approximating a geometrical representation of the road boundary, such as an initial, rough and/or pre-estimate thereof, a mathematical function describing an approximation of the road boundary is provided, derived from the detected one or more longitudinal and corresponding lateral positions of the road boundary. Accordingly, the geometrical representation of the road boundary may thus be represented by e.g., a curved and/or straight line. Moreover, thereby, by approximating the relative lateral offset between the geometrical representation of the at least first lane marking and the detected road boundary represented by the geometrical representation of the road boundary, there is estimated a difference in a lateral direction between the approximated geometrical representation of the at least first lane marking and the approximated geometrical representation of the road boundary, valid at, derived from and/or based on a lateral difference at at least one longitudinal position. Said at least one longitudinal position may be selected as suitable for the situation and/or conditions at hand. Thus, the at least one longitudinal position may be positioned within the field of view as well as outside the field of view. In the latter scenario, the geometrical representation of the at least first lane marking and/or the geometrical representation of the road boundary may be evaluated to derive for instance a local offset, i.e., an offset at $x_0$, which may be accomplished e.g., by extrapolation outside e.g., the polynomial region of the field of view.

Optionally, approximating the relative lateral offset, may comprise approximating a relative lateral offset between the geometrical representation of the at least first lane marking and the detected road boundary, wherein the relative lateral offset is derived at least partly based on a first offset value, at a first longitudinal position, between a first lateral position of the detected road boundary and a corresponding first lateral position of the geometrical representation of the first lane marking; and further derived at least partly based on at least a second offset value, at at least a second longitudinal position, between at least a second lateral position of the detected road boundary and a corresponding at least second lateral position of the geometrical representation of the first lane marking. Thereby, there is estimated a difference in a lateral direction between the approximated geometrical representation of the at least first lane marking and the detected road boundary—and/or the approximated geometrical representation of the detected road boundary—valid at, derived from and/or based on a first offset value at a first longitudinal position and at least a second offset at at least a second longitudinal position. That is, the approximated relative lateral offset is valid at, derived from and/or based on two or more lateral deltas between two or more lateral positions of the geometrical representation of the at least first lane marking and one or more lateral position of the detected road boundary of the corresponding longitudinal positions. The relative lateral offset may then e.g., be derived from a mean value of the first and the at least second offset value. Additionally or alternatively, the relative lateral offset may then be derived from weighted values of the first and/or the at least second offset value.

Optionally, detecting the one or more positions of the at least first lane marking, may comprise detecting one or more positions of the at least first lane marking, at a first and at at least a second time instant. Approximating the geometrical representation of the at least first lane marking then comprises approximating a first geometrical representation of the at least first lane marking based on one or more of the positions of the at least first lane marking derived from the first time instant, and approximating a second geometrical representation of the at least first lane marking based on one or more of the positions of the at least first lane marking derived from the second time instant. Moreover, detecting the one or more positions of the road boundary then comprises detecting one or more positions of a road boundary, at the first and at the at least second time instant. Furthermore, approximating the relative lateral offset then comprises approximating a relative lateral offset between the geometrical representation of the at least first lane marking and the detected road boundary, wherein the relative lateral offset is derived at least partly based on a first relative lateral offset between the first geometrical representation of the at least first lane marking and the detected road boundary derived from the first time instant, and furthermore derived at least partly based on a second relative lateral offset between the second geometrical representation of the at least first lane marking and the detected road boundary derived from the second time instant.

Thereby, by detecting one or more positions of the at least first lane marking at a first and at at least a second time instant, longitudinal and corresponding lateral positions of the at least first lane marking are detected at plural time instances. The time instances may be arbitrarily selected and determined as commonly known in the art, for instance separated in time by approximately 25 ms. Moreover, thereby, by approximating a first geometrical representation of the at least first lane marking based on one or more of the positions of the at least first lane marking derived from the first time instant, and approximating a second geometrical representation of the at least first lane marking based on one or more of the positions of the at least first lane marking derived from the second time instant, plural geometrical representations of the at least first lane marking are approximated derived from plural time instances. Moreover, thereby, by detecting one or more positions of a road boundary, at the first and at the at least second time instant, longitudinal and corresponding lateral positions of the road boundary are detected at plural time instances. Moreover, thereby, by the relative lateral offset being derived at least partly based on a first relative lateral offset between the first geometrical representation of the at least first lane marking and the detected road boundary derived from the first time instant, and furthermore derived at least partly based on a second relative lateral offset between the second geometrical representation of the at least first lane marking and the detected road boundary derived from the second time instant, the resulting relative lateral offset may be derived from plural offsets derived from plural time instances. Accordingly, yet further enhanced round boundary information quality may be provided, in that data detected at plural time instances may be utilized. For instance, the resulting relative lateral offset may be derived from a mean value of the first relative lateral offset derived from the first time instant and the at least second relative lateral offset derived from the at least second time instant. Additionally or alternatively, the relative lateral offset may be derived from weighted values of the first relative lateral offset derived from the first time instant and the at least second relative lateral offset derived from the at least second time instant.

Optionally, the boundary estimation system may further define at least a section of an intervention path based on the fictive outer boundary. Thereby, an intervention path is provided which—rather than as commonly known being defined based on e.g., a geometrical representation of a lane marking—is derived from the defined fictive outer boundary. The expression "intervention path"—which commonly may be referred to as an "avoiding path"—is throughout this disclosure intended to refer to an intervention path as commonly known in the art, with the exception that the intervention path is defined based on the introduced fictive outer boundary. Additionally or alternatively, optionally, the boundary estimation system may further assess a risk of an imminent road departure of the vehicle based on comparison of a relative lateral position of the vehicle to the fictive outer boundary. Thereby, a risk assessment is performed which—rather than as commonly known be based on comparison of a relative lateral position of the vehicle to e.g., a geometrical representation of a lane marking—is based on a relative lateral position of the vehicle to the defined fictive outer boundary. Determining a lateral position of the vehicle relative the fictive outer boundary may be accomplished as commonly known in the art. Moreover, assessing the risk of an imminent road departure, e.g., estimated to occur within 1 s, is throughout this disclosure intended to refer to commonly known manners of doing so, with the exception that the risk assessment is based on the introduced fictive outer boundary. According to an example, a warning may be initiated to the vehicle driver, based on said assessed risk. Furthermore, additionally or alternatively, the boundary estimation system may optionally intervene in steering and/or braking of the vehicle based on a proximity of a relative lateral position of the vehicle to the fictive outer boundary. Thereby, intervention is provided which—rather than as commonly known be based on a proximity of a relative lateral position of the vehicle to e.g., a geometrical representation of a lane marking—is based on a proximity of a relative lateral position of the vehicle to the introduced fictive outer boundary. Determining a proximity of a relative lateral position of the vehicle to the fictive outer boundary may be accomplished in any known manner. Moreover, intervention may be accomplished as commonly known, for instance by means of steering and/or braking.

According to a second aspect of embodiments herein, the object is achieved by a boundary estimation system adapted for on-board a vehicle estimating a boundary of a road on which the vehicle is positioned. The road comprises at least a first lane marking arranged to form a straight and/or curved intermittent or continuous line on a road surface along the road. The boundary estimation system comprises a monitoring unit adapted for monitoring the surroundings of the vehicle, a lane marking unit adapted for detecting one or more positions of the at least first lane marking, and a geometrical representation approximating unit adapted for approximating a geometrical representation of the at least first lane marking based on one or more of the detected positions of the at least first lane marking. The boundary estimation system further comprises a road boundary detecting unit adapted for detecting one or more positions of a road boundary of the road, an offset approximating unit adapted for approximating a relative lateral offset between the geometrical representation of the at least first lane marking and the detected road boundary, and a fictive boundary defining unit adapted for defining a fictive outer boundary of at least a section of the road, based on laterally shifting at least a section of the geometrical representation of the at least first lane marking, the relative lateral offset.

Optionally, the offset approximating unit may further be adapted for approximating a relative lateral offset between the geometrical representation of the at least first lane marking and the detected road boundary, derived from one or more detected lateral positions of the road boundary and respective one or more lateral positions of the geometrical representation of the first lane marking having corresponding longitudinal positions. Moreover, optionally, the geometrical representation approximating unit may further be adapted for approximating a geometrical representation of the road boundary, based on one or more of the detected positions of the road boundary. The offset approximating unit is then further adapted for approximating a relative lateral offset between the geometrical representation of the at least first lane marking and the detected road boundary represented by the geometrical representation of the road boundary.

Furthermore, optionally, the offset approximating unit may further be adapted for approximating a relative lateral offset between the geometrical representation of the at least first lane marking and the detected road boundary, wherein the relative lateral offset is derived at least partly based on a first offset value, at a first longitudinal position, between a first lateral position of the detected road boundary and a corresponding first lateral position of the geometrical representation of the first lane marking; and at least partly based on at least a second offset value, at at least a second longitudinal position, between at least a second lateral position of the detected road boundary and a corresponding at least second lateral position of the geometrical representation of the first lane marking.

Moreover, optionally, the lane marking detecting unit may further be adapted for detecting one or more positions of the at least first lane marking, at a first and at at least a second time instant. The geometrical representation unit is then further adapted for approximating a first geometrical representation of the at least first lane marking based on one or more of the positions of the at least first lane marking derived from the first time instant; and approximating a second geometrical representation of the at least first lane marking based on one or more of the positions of the at least first lane marking derived from the second time instant. The road boundary detecting unit is then further adapted for detecting one or more positions of a road boundary, at the first and at the at least second time instant. Moreover, the offset approximating unit is then further adapted for approximating a relative lateral offset between the geometrical representation of the at least first lane marking and the detected road boundary, wherein the relative lateral offset is derived at least partly based on a first relative lateral offset between the first geometrical representation of the at least first lane marking and the detected road boundary derived from the first time instant; and at least partly based on a second relative lateral offset between the second geometrical representation of the at least first lane marking and the detected road boundary derived from the second time instant.

Optionally, the boundary estimation system may comprise an intervention path defining unit adapted for defining at least a section of an intervention path based on the fictive outer boundary. Additionally or alternatively, optionally, the boundary estimation system may comprise a risk assessment unit adapted for assessing a risk of an imminent road departure of the vehicle based on comparison of a relative lateral position of the vehicle to the fictive outer boundary. Furthermore, additionally or alternatively, the boundary estimation system may optionally comprise an intervening unit adapted for intervening in steering and/or braking of the vehicle based on a proximity of a relative lateral position of the vehicle to the fictive outer boundary.

Similar advantages as those mentioned in the foregoing in relation to the first aspect correspondingly apply to the second aspect, which is why these advantages are not further discussed.

According to a third aspect of embodiments herein, the object is achieved by a vehicle at least partly comprising the monitoring unit, the lane marking detecting unit, the geometrical representation approximating unit, the road boundary detecting unit, the offset approximating unit, the fictive boundary defining unit, the optional intervention path defining unit, the optional risk assessment unit and/or the optional intervening unit discussed above. Similar advantages as those mentioned in the foregoing in relation to the first aspect correspondingly apply to the third aspect, which is why these advantages are not further discussed.

According to a fourth aspect of embodiments herein, the object is achieved by a computer program product comprising a computer program containing computer program code means arranged to cause a computer or a processor to execute the steps of the boundary estimation system discussed above, stored on a computer-readable medium or a carrier wave. Yet again, similar advantages as those mentioned in the foregoing in relation to the first aspect correspondingly apply to the fourth aspect, which is why these advantages are not further discussed.

BRIEF DESCRIPTION OF THE DRAWINGS

The various aspects of the non-limiting embodiments of the disclosure, including particular features and advantages, will be readily understood from the following detailed description and the accompanying drawings.

DETAILED DESCRIPTION

Figure 1:
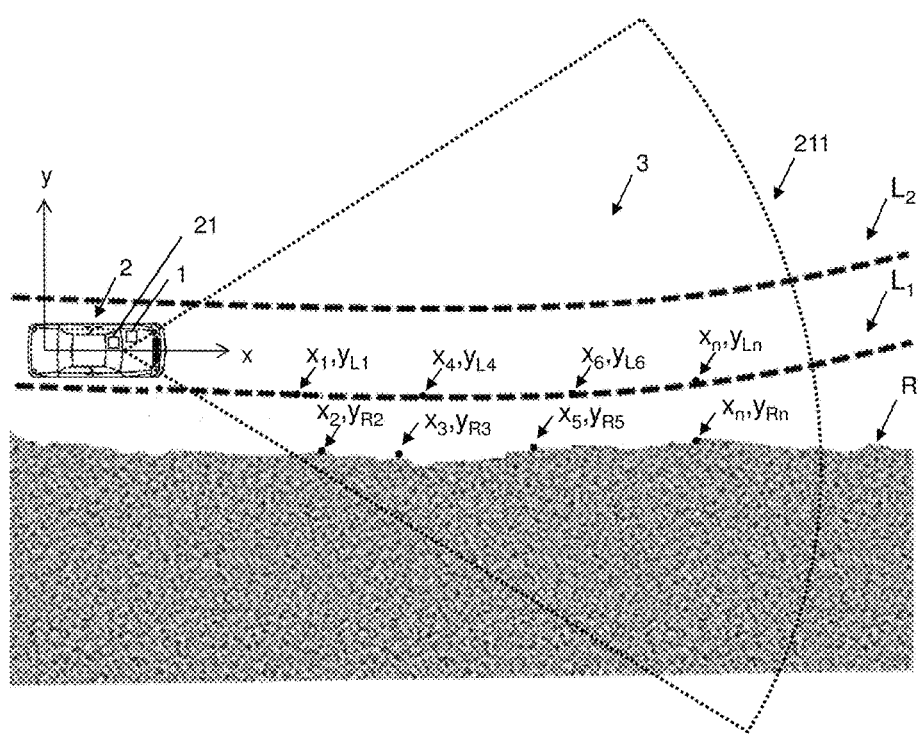
FIG. 1 illustrates a schematic overview of an exemplifying boundary estimation system on-board a vehicle according to embodiments of the disclosure, and surroundings of a road on which the vehicle is positioned.

The non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout, and reference characters followed by one or more apostrophes refer to elements resembling elements previously discussed. Dashed lines of some boxes in the figures indicate that these units or actions are optional and not mandatory. In the following, according to embodiments herein which relate to in view of a vehicle estimating a boundary of a road on which the vehicle is positioned, there will be disclosed an approach for approximating a boundary of the road constraining, e.g., laterally, a road surface considered drivable.

Referring now to the figures and FIG. 1 in particular, there is illustrated a schematic overview of an exemplifying boundary estimation system 1 on-board a vehicle 2 according to embodiments of the disclosure, and surroundings of a road 3 on which the vehicle 2 is positioned. The boundary estimation system 1, which will be described in greater detail further on, is adapted for on-board the vehicle 2 estimating a boundary of the road 3 on which the vehicle 2 is positioned. The vehicle 2 shown in the exemplifying embodiment comprises the boundary estimation system 1, and is a passenger car supporting—at least to some extent—autonomous driving. Furthermore, the vehicle 2 is in the shown embodiment driven on the right-hand side of the road 3, although this is merely exemplifying; according to alternative embodiments, the vehicle 2 may likewise be driven on the left-hand side of the road 3. The road 3 comprises at least a first lane marking $L_1$ arranged to form a straight and/or curved intermittent or continuous line on a road surface along the road 3. Here, the road 3 further comprises an exemplifying second lane marking $L_2$ similarly arranged to form a straight and/or curved intermittent or continuous line on a road surface along the road 3. The first lane marking $L_1$ is in the shown exemplifying embodiment arranged alongside a road boundary R of the road 3, here represented by a road edge beyond which there is e.g., grass and/or gravel. The second lane marking $L_2$ is in the shown exemplifying embodiment arranged in parallel to the first lane marking $L_1$. Further shown in FIG. 1 is how the boundary estimation system 1 monitors the surroundings of the vehicle 2, for instance with support from at least a first camera 21 on-board the vehicle 2. Positions $(x_1,y_{L1})$, $(x_4, y_{L4})$, $(x_6,y_{L6})$ of the at least first lane marking $L_1$ and positions $(x_2,y_{R2})$, $(x_3,y_{R3})$, $(x_5,y_{R5})$ of the road boundary R—which positions respectively are within parenthesis to indicate that they represent coordinates—are detected within a field of view 211.

Figure 2A:
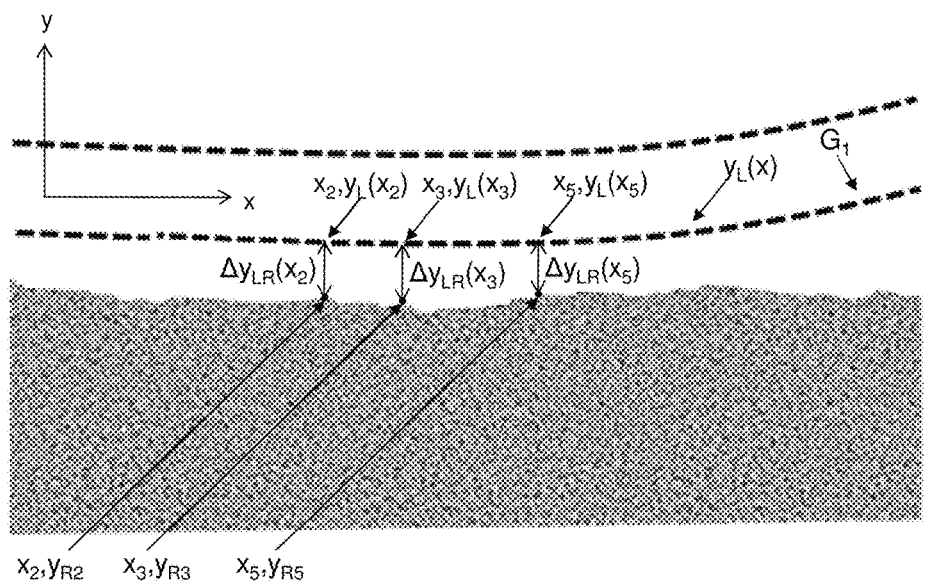
FIGS. 2A-B illustrates schematic overviews according to exemplifying embodiments of the disclosure, which may result from the conditions of FIG. 1.

FIG. 2A illustrates a schematic overview according to an exemplifying embodiment of the disclosure, which may result from the conditions of FIG. 1. Shown is a geometrical representation $G_1$ of the first lane marking $L_1$ based on the detected positions $(x_1,y_{L1})$, $(x_4,y_{L4})$, $(x_6,y_{L6})$ of the first lane marking $L_1$. Further shown is three exemplifying offset values, namely an offset value $\Delta y_{LR}(x_2)$ at the longitudinal position $x_2$ between the lateral position $y_{R2}$ of the detected road boundary R and a corresponding lateral position $y_L(x_2)$ of the geometrical representation $G_1$; an offset value $\Delta y_{LR}(x_3)$ at the longitudinal position $x_3$ between the lateral position $y_{R3}$ of the detected road boundary R and a corresponding lateral position $y_L(x_3)$ of the geometrical representation $G_1$; and an offset value $\Delta y_{LR}(x_5)$ at the longitudinal position $x_5$ between the lateral position $y_{R5}$ of the detected road boundary R and a corresponding lateral position $y_L(x_5)$ of the geometrical representation $G_1$.

Figure 2B:
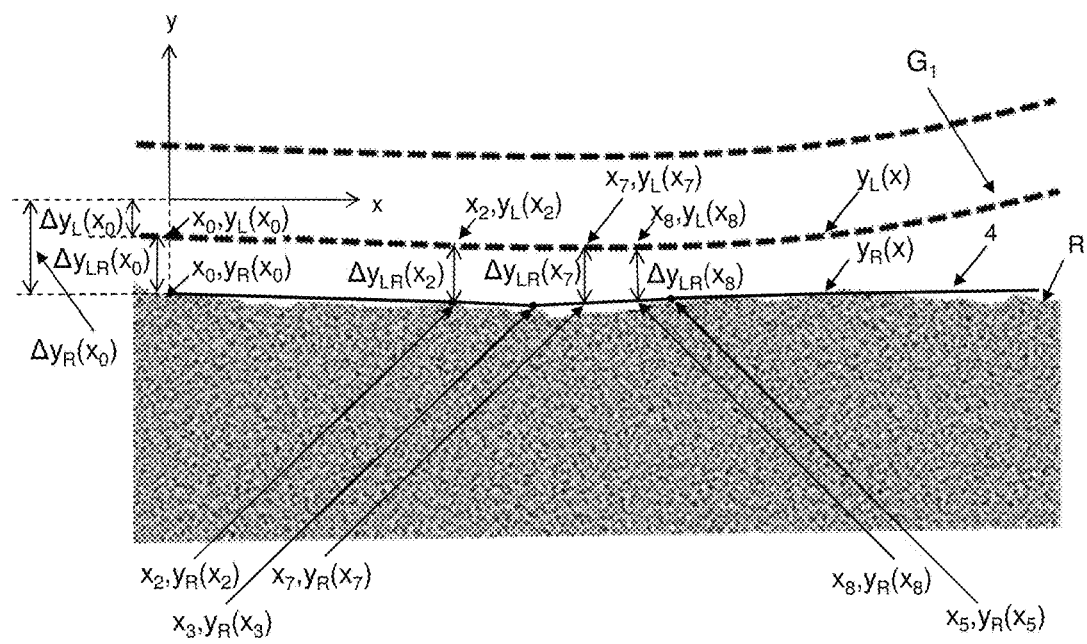

FIG. 2B illustrates a schematic overview according to an exemplifying alternative embodiment of the disclosure, which also may result from the conditions of FIG. 1. Shown is an optional geometrical representation 4 of the road boundary R, which is based on one or more of the detected positions $(x_2,y_{R2})$, $(x_3,y_{R3})$, $(x_5,y_{R5})$ of the road boundary R. Further shown is three alternative exemplifying offset values, namely the offset value $\Delta y_{LR}(x_2)$ at the longitudinal position $x_2$ between the lateral position $y_R(x_2)$ of the geometrical representation 4 of the detected road boundary R and the corresponding lateral position $y_L(x_2)$ of the geometrical representation $G_1$ of the first lane marking $L_1$; an offset value $\Delta y_{LR}(x_7)$ at a longitudinal position $x_7$ between the lateral position $y_R(x_7)$ of the geometrical representation 4 of the detected road boundary R and the corresponding lateral position $y_L(x_7)$ of the geometrical representation $G_1$ of the first lane marking $L_1$; and an offset value $\Delta y_{LR}(x_8)$ at a longitudinal position $x_8$ between the lateral position $y_R(x_8)$ of the geometrical representation 4 of the detected road boundary R and the corresponding lateral position $y_L(x_8)$ of the geometrical representation $G_1$ of the first lane marking $L_1$. Additionally shown is an optional local offset $\Delta y_{LR}(x_0)$, i.e., an offset at $x_0$, which may represent an offset derived by extrapolation outside the polynomial region of the field of view 211. The local offset $\Delta y_{LR}(x_0)$—which may represent the current position of the vehicle 2—may optionally be the result of subtracting an offset $\Delta y_L(x_0)$ for the geometrical representation $G_1$ of the first lane marking $L_1$ from an offset $\Delta y_R(x_0)$ for the geometrical representation 4 of the detected road boundary R.

Figure 3:
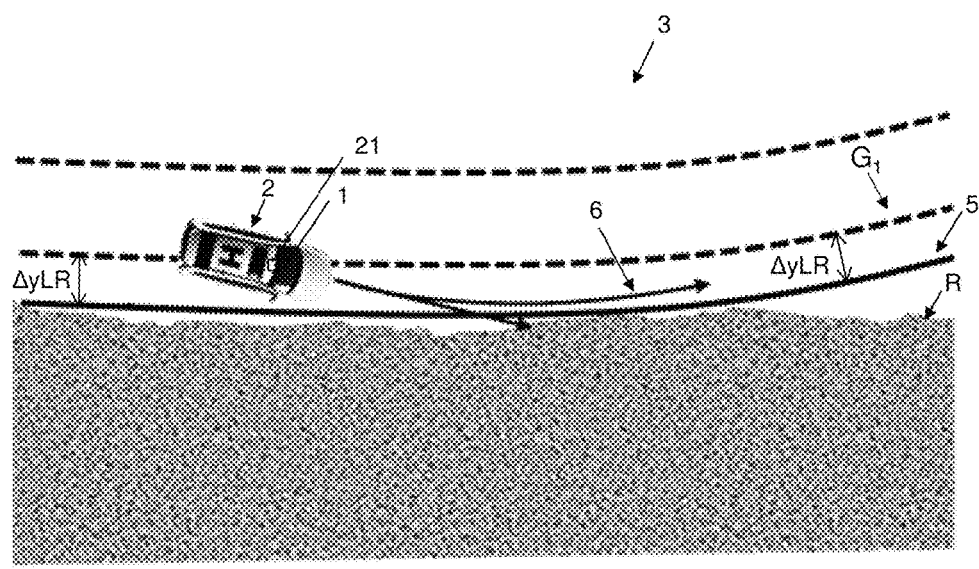
FIG. 3 illustrates a schematic overview of a relative lateral offset and a fictive outer boundary according to exemplifying embodiments of the disclosure, which may result from the conditions of FIGS. 2A-B.

FIG. 3 illustrates a schematic overview of a relative lateral offset $\Delta y_{LR}$ and a fictive outer boundary 5 according to an exemplifying embodiment of the disclosure, which may result from the conditions of FIGS. 2A and/or 2B. The relative lateral offset $\Delta y_{LR}$—which has a constant magnitude, i.e., a fixed value, along the geometrical representation $G_1$ of the first lane marking $L_1$ will be described in greater detail further on in this description. The fictive outer boundary 5—which is "parallel" to the geometrical representation $G_1$ distanced the relative lateral offset $\Delta y_{LR}$ therefrom, i.e., positioned a fixed distance namely the relative lateral offset $\Delta y_{LR}$ from the geometrical representation $G_1$—will in a similar manner be described in greater detail further on in this description. Further shown is an intervention path 6, which is based on the fictive outer boundary 5.

Figure 4A:
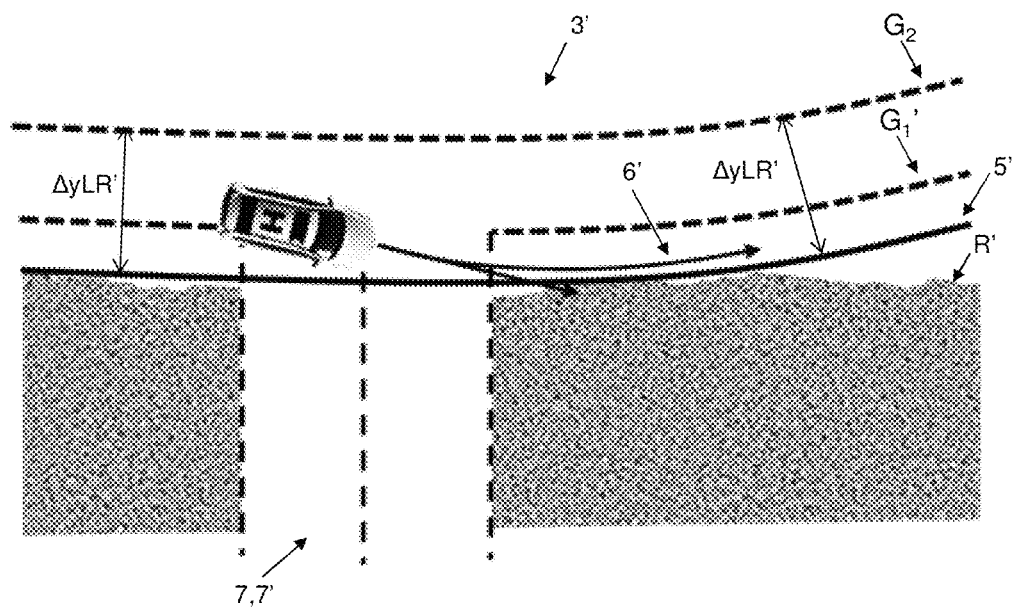
FIGS. 4A-D illustrates schematic overviews of varying road surroundings, and of relative lateral offsets and fictive outer boundaries according to exemplifying alternative embodiments of the disclosure.

FIG. 4A illustrates a schematic overview of an alternative road surroundings, and a relative lateral offset $\Delta y_{LR}'$ and a fictive outer boundary 5' according to an exemplifying alternative embodiment of the disclosure. The road boundary R' here comprises a gap 7 in the form of a road exit 7', due to which there is a disruption in the first lane marking $L_1'$ and subsequently in the geometrical representation $G_1'$ of the first lane marking $L_1'$. Further shown is thus a geometrical representation $G_2$ of the second lane marking $L_2$, with which the fictive outer boundary 5' instead is parallel, distanced the relative lateral offset $\Delta y_{LR}'$ therefrom.

Figure 4B:
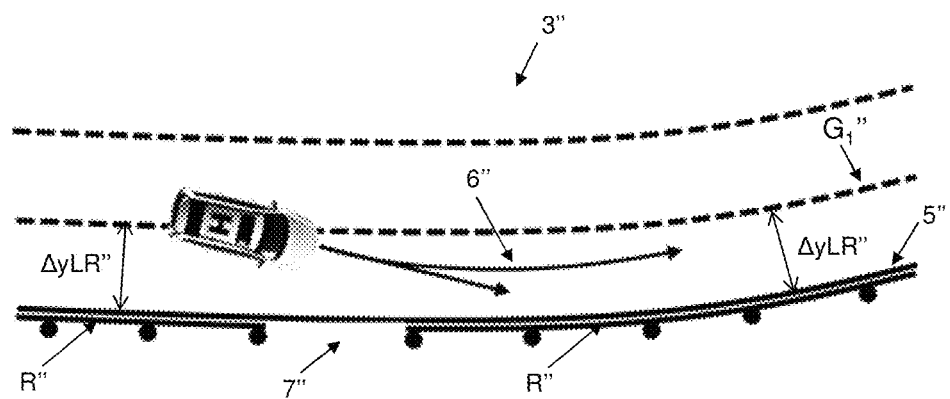

FIG. 4B illustrates a schematic overview of another alternative road surroundings, and a relative lateral offset $\Delta y_{LR}''$ and a fictive outer boundary 5" according to an exemplifying another alternative embodiment of the disclosure. The fictive outer boundary 5" is parallel to the geometrical representation $G_1''$ of the first lane marking $L_1'$, distanced the relative lateral offset $\Delta y_{LR}''$ therefrom. The road boundary R" is here represented by a barrier having a gap 7", which gap 7" the fictive outer boundary 5" may be independent of.

Figure 4C:
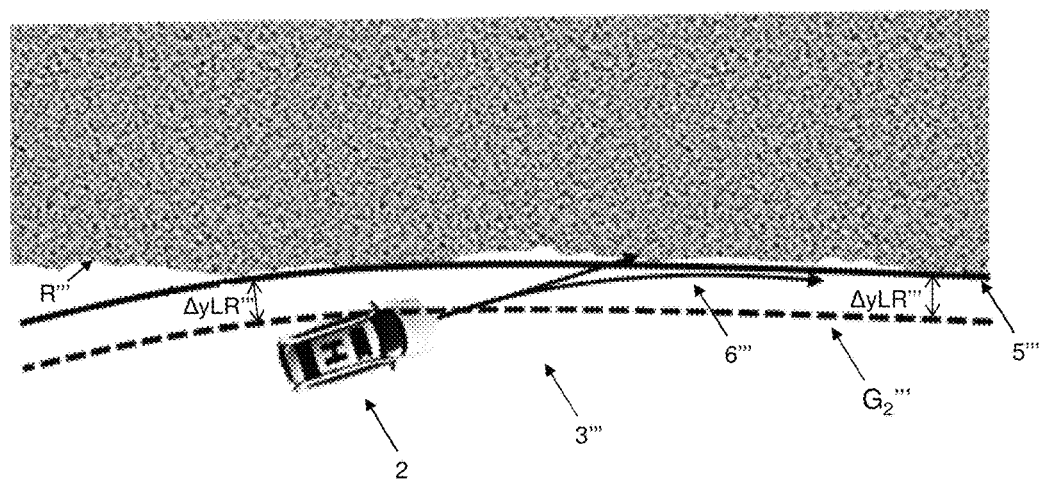

FIG. 4C illustrates a schematic overview of yet another alternative road surroundings, and a relative lateral offset $\Delta y_{LR}'''$ and a fictive outer boundary 5''' according to an exemplifying yet another alternative embodiment of the disclosure. The fictive outer boundary 5''' is parallel to the geometrical representation $G_2'''$ of the second lane marking $L_2'''$, distanced the relative lateral offset $\Delta y_{LR}'''$ therefrom. The exemplifying road boundary R''' is here situated on the left-hand side of the vehicle 2.

Figure 4D:
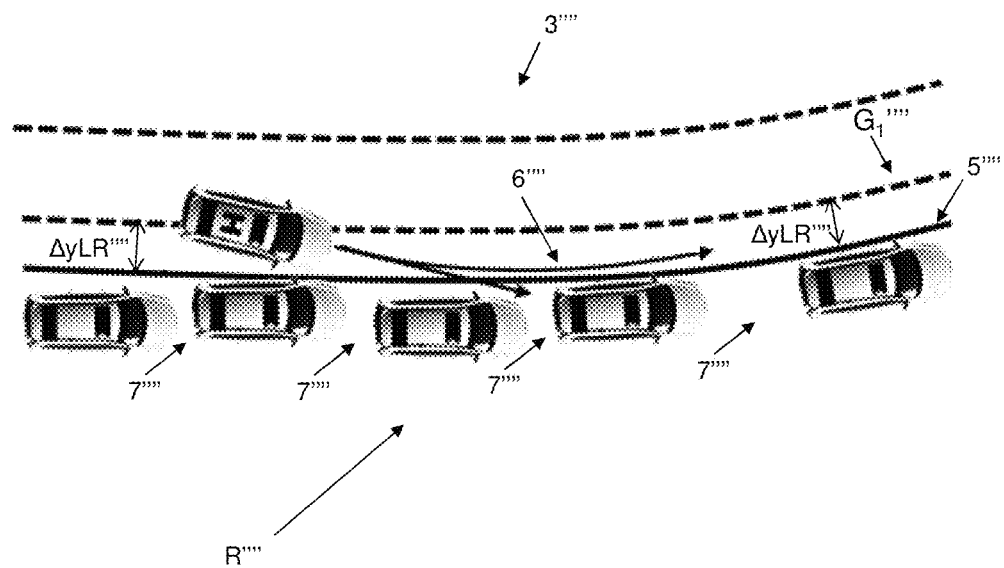

FIG. 4D illustrates a schematic overview of still another alternative road surroundings, and a relative lateral offset $\Delta y_{LR}''''$ and a fictive outer boundary 5'''' according to an exemplifying still another alternative embodiment of the disclosure. The fictive outer boundary 5' is parallel to the geometrical representation $G_1''''$ of the first lane marking $L_1''''$, distanced the relative lateral offset $\Delta y_{LR}''''$ therefrom. The exemplifying road boundary R'''' is here represented by a line of parked vehicles, between which there naturally are gaps 7''''; the fictive outer boundary 5'''' may, however, be independent of said gaps 7''''.

Figure 5:
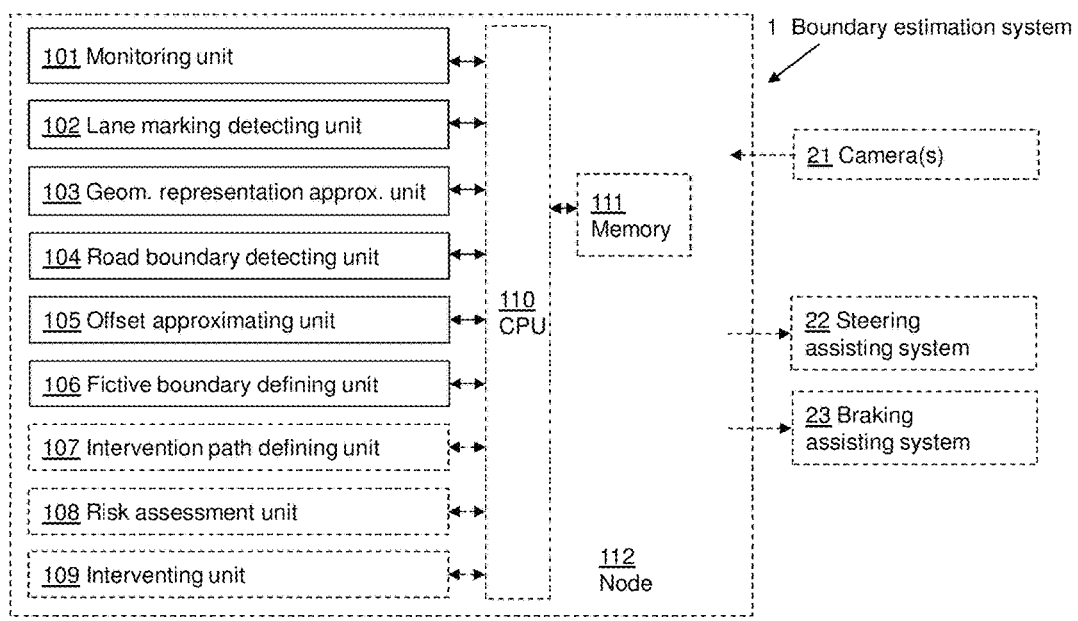
FIG. 5 is a schematic block diagram illustrating an exemplifying boundary estimation system according to embodiments of the disclosure.

As further shown in FIG. 5, which depicts a schematic block diagram illustrating a boundary estimation system 1 according to embodiments of the disclosure, the boundary estimation system 1 comprises a monitoring unit 101, a lane marking detecting unit 102, a geometrical representation approximating unit 103, a road boundary detecting unit 104, an offset approximating unit 105, and a fictive boundary defining unit 106, all of which will be described in greater detail further on. The boundary estimation system 1 may furthermore comprise an optional intervention path defining unit 107, an optional risk assessment unit 108 and/or an optional intervening unit 109, which similarly will be described in greater detail further on in the description. Furthermore, the embodiments herein for enabling the boundary estimation system 1 for in view of the vehicle 2 estimating a boundary of the road 3 on which the vehicle 2 is positioned, may be implemented through one or more processors, such as a processor 110, here denoted CPU, together with computer program code for performing the functions and actions of the embodiments herein. Said program code may also be provided as a computer program product, for instance in the form of a data carrier carrying computer program code for performing the embodiments herein when being loaded into the boundary estimation system 1. One such carrier may be in the form of a CD ROM disc. It is however feasible with other data carriers such as a memory stick. The computer program code may furthermore be provided as pure program code on a server and downloaded to the boundary estimation system 1.

The boundary estimation system 1 may further comprise a memory 111 comprising one or more memory units. The memory 111 may be arranged to be used to store e.g., information, and further to store data, configurations, schedulings, and applications, to perform the methods herein when being executed in the boundary estimation system 1. Furthermore, one or more of said units 101, 102, 103, 104, 105, 106, 107, 108, 109, and/or the processor 110 and/or the memory 11 may for instance be implemented in one or several arbitrary nodes 112, and/or in one or more mobile units which may be carried on-board, be mounted to and/or be integrated with the vehicle 2. A node 112 may be an electronic control unit (ECU) or any suitable generic electronic device throughout the vehicle 2. According to an alternative example, the boundary estimation system 1 may be represented by a plug-in solution, such that said boundary estimation system 1 at least partly is implemented on for instance a dongle. In that manner, an aftermarket solution may be provided to any arbitrary vehicle 2 and/or mobile device suitable. Those skilled in the art will also appreciate that one or more of the units 101, 102, 103, 104, 105, 106, 107, 108, 109 described above, and which will be described in more detail later on in this description, may refer to a combination of analog and digital circuits, and/or one or more processors configured with software and/or firmware, e.g., stored in a memory such as the memory 111, that when executed by the one or more processors such as the processor 110 perform as will be described in more detail later on. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip). Further shown in FIG. 5 is the exemplifying optional at least first camera 21, an optional steering assisting system 22, and an optional braking assisting system 23.

Figure 6:
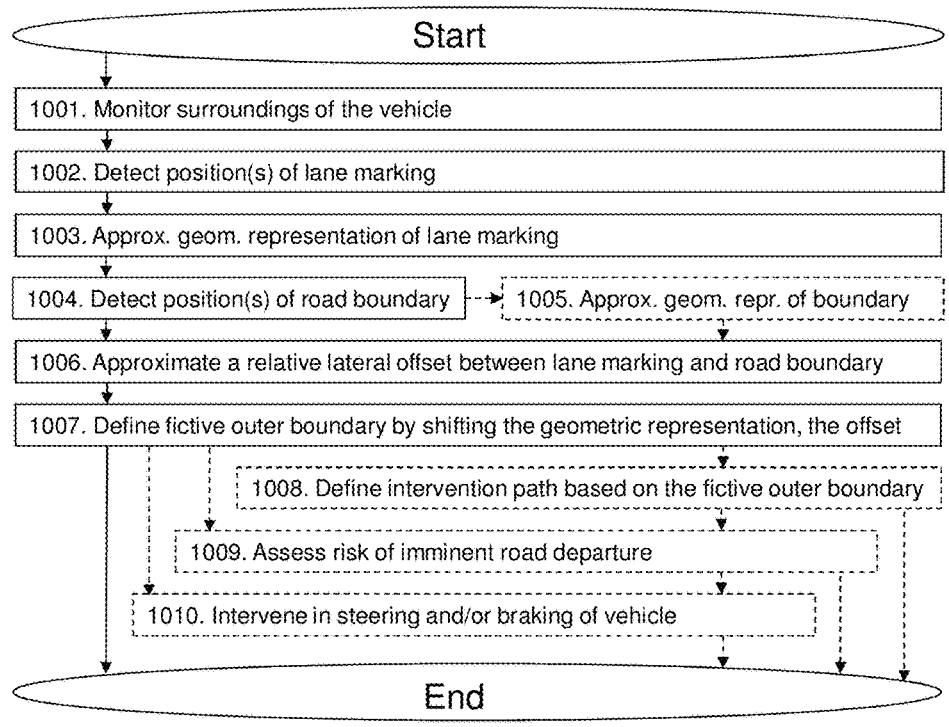
FIG. 6 is a flowchart depicting an exemplifying method for estimating a boundary of a road according to embodiments of the disclosure.

FIG. 6 is a flowchart depicting an exemplifying method for estimating a boundary of the road 3 according to embodiments of the disclosure. The method is performed by the boundary estimation system 1 on-board the vehicle 2. As discussed in conjunction with FIG. 1, the road 3 comprises at least a first lane marking $L_1$ arranged to form a straight and/or curved intermittent or continuous line on a road surface along the road 3. The exemplifying method, which may be continuously repeated, comprises the following actions discussed with support from FIGS. 1-5. The actions may be taken in any suitable order, e.g., may Actions 1002 and 1004 be performed simultaneously and/or in an alternate order.

Action 1001

In Action 1001, the boundary estimation system 1 monitors the surroundings of the vehicle 2. Correspondingly, the monitoring unit 101 is adapted for monitoring the surroundings of the vehicle 2. Thus, as shown with support at least from FIGS. 1 and 5, the environment surrounding the vehicle 2—such as the road 3, road markings $L_1$, $L_2$ and/or road edges R—is sensed, for instance with support from the one or more cameras 21.

Action 1002

In Action 1002, the boundary estimation system 1 detects one or more positions $(x_n, y_{Ln})$ of the at least first lane marking $L_1$. Correspondingly, the lane marking detecting unit 102 is adapted for detecting one or more positions $(x_n, y_{Ln})$ of the at least first lane marking $L_1$. Thus, as shown with support at least from FIGS. 1 and 5, one or more longitudinal and corresponding lateral positions $(x_n, y_{Ln})$ of one or more lane markings $L_1$ are located, for instance the positions $(x_1, y_{L1})$, $(x_4, y_{L4})$, $(x_6, y_{L6})$.

Optionally, detecting one or more positions $(x_n, y_{Ln})$ of the at least first lane marking $L_1$ may comprise detecting one or more positions $(x_n, y_{Ln})$ of the at least first lane marking $L_1$, at a first time instant $t_1$ (not shown) and at at least a second time instant $t_2$ (not shown). Correspondingly, the lane marking detecting unit may be adapted for detecting one or more positions $(x_n, y_{Ln})$ of the at least first lane marking $L_1$, at a first time instant $t_1$ and at at least a second time instant $t_2$. Thus, longitudinal and corresponding lateral positions $(x_n, y_{Ln})$ of the at least first lane marking $L_1$ are then detected at plural time instances $t_1$, $t_2$.

Action 1003

In Action 1003, the boundary estimation system 1 approximates the geometrical representation $G_1$ of the at least first lane marking $L_1$ based on one or more of the detected positions $(x_n, y_{Ln})$ of the at least first lane marking $L_1$. Correspondingly, the geometrical representation approximating unit 103 is adapted for approximating the geometrical representation $G_1$ of the at least first lane marking $L_1$ based on one or more of the detected positions $(x_n, y_{Ln})$ of the at least first lane marking $L_1$. Thus, as shown with support at least from FIGS. 1, 2A, 2B and 5, a mathematical function $G_1$ describing an approximation of the at least first lane marking $L_1$ is derived from the detected one or more longitudinal and corresponding lateral positions $(x_1, y_{L1})$, $(x_4, y_{L4})$, $(x_6, y_{L6})$ thereof.

Optionally—following upon in Action 1002 optionally detecting one or more positions $(x_n, y_{Ln})$ of the at least first lane marking $L_1$, at a first time instant $t_1$ and at at least a second time instant $t_2$—approximating the geometrical representation $G_1$ of the at least first lane marking $L_1$ may comprise: approximating a first geometrical representation $G_{11}$ (not shown) of the at least first lane marking $L_1$ based on one or more of the positions $(x_n, y_{Ln})$ of the at least first lane marking $L_1$ derived from the first time instant $t_1$; and approximating a second geometrical representation $G_{12}$ (now shown) of the at least first lane marking $L_1$ based on one or more of the positions $(x_n, y_{Ln})$ of the at least first lane marking $L_1$ derived from the second time instant $t_2$. Correspondingly, the geometrical representation approximating unit 103 may be adapted for approximating a first geometrical representation $G_{11}$ of the at least first lane marking $L_1$ based on one or more of the positions $(x_n, y_{Ln})$ of the at least first lane marking $L_1$ derived from the first time instant $t_1$; and further adapted for approximating a second geometrical representation $G_{12}$ of the at least first lane marking $L_1$ based on one or more of the positions $(x_n, y_{Ln})$ of the at least first lane marking $L_1$ derived from the second time instant $t_2$. Thus, plural geometrical representations $G_{11}, G_{12}$ of the at least first lane marking $L_1$ are then approximated derived from plural time instances $t_1, t_2$.

Action 1004

In Action 1004, the boundary estimation system 1 detects one or more positions $(x_n, y_{Rn})$ of the road boundary R of the road 3. Correspondingly, the road boundary detecting unit 104 is adapted for detecting one or more positions $(x_n, y_{Rn})$ of the road boundary R of the road 3. Thus, as shown with support at least from FIGS. 1 and 5, one or more longitudinal and corresponding lateral positions $(x_n, y_{Rn})$ of the road boundary R along the road 3 are located, for instance the positions $(x_2, y_{L2})$, $(x_3, y_{L3})$, $(x_5, y_{L5})$.

Optionally—following upon in Action 1003 optionally approximating a first geometrical representation $G_{11}$ of the at least first lane marking $L_1$ based on one or more of the positions $(x_n, y_{Ln})$ of the at least first lane marking $L_1$ derived from the first time instant $t_1$ and approximating a second geometrical representation $G_{12}$ of the at least first lane marking $L_1$ based on one or more of the positions $(x_n, y_{Ln})$ of the at least first lane marking $L_1$ derived from the second time instant $t_2$—detecting one or more positions $(x_n, y_{Rn})$ of the road boundary R may comprise detecting one or more positions $(x_n, y_{Rn})$ of the road boundary R, at the first time instant $t_1$ and at the at least second time instant $t_2$. Correspondingly, the road boundary detecting unit 104 may be adapted for detecting one or more positions $(x_n, y_{Rn})$ of a road boundary R at the first time instant $t_1$ and at the at least second time instant $t_2$. Thus, longitudinal and corresponding lateral positions $(x_n, y_{Rn})$ of the road boundary R are then detected at plural time instances $t_1, t_2$.

Action 1005

In optional Action 1005, the boundary estimation system 1 may approximate the geometrical representation 5 of the road boundary R, based on one or more of the detected positions $(x_n, y_{Rn})$ of the road boundary R. Correspondingly, the geometrical representation approximating unit 103 may be adapted for approximating the geometrical representation 5 of the road boundary R, based on one or more of the detected positions $(x_n, y_{Rn})$ of the road boundary R. Thus, as shown with support at least from FIGS. 1, 2B and 5, a mathematical function 4 describing an approximation 4 of the road boundary R is provided, derived from the detected one or more longitudinal and corresponding lateral positions $(x_n, y_{Rn})$ of the road boundary R, for instance $(x_2, y_{R2})$, $(x_3, y_{R3})$, $(x_5, y_{R5})$.

Action 1006

In Action 1006, the boundary estimation system 1 approximates the relative lateral offset $\Delta y_{LR}$ between the geometrical representation $G_1$ of the at least first lane marking $L_1$ and the detected road boundary R. Correspondingly, the offset approximating unit 105 is adapted for approximating the relative lateral offset $\Delta y_{LR}$ between the geometrical representation $G_1$ of the at least first lane marking $L_1$ and the detected road boundary R. Thus, as shown with support at least from FIGS. 2A, 2B and 5, there is estimated a difference $\Delta y_{LR}$ in a lateral direction between the approximated geometrical representation $G_1$ of the at least first lane marking $L_1$ and the detected road boundary R, valid at, derived from and/or based on a lateral difference $\Delta y_{LR}(x_n)$ at at least one $\Delta y_{LR}(x_n)$ longitudinal position $x_n$, such as based on for instance $\Delta y_{LR}(x_2)$, $\Delta y_{LR}(x_3)$, $\Delta y_{LR}(x_5)$, $\Delta y_{LR}(x_7)$, $\Delta y_{LR}(x_8)$, and/or $\Delta y_{LR}(x_0)$ at respective longitudinal position $x_2, x_3, x_5, x_7, x_8$, and $x_0$.

Optionally, approximating the relative lateral offset $\Delta y_{LR}$ may comprise approximating the relative lateral offset $\Delta y_{LR}$ between the geometrical representation $G_1$ of the at least first lane marking $L_1$ and the detected road boundary R, derived from one or more detected lateral positions $y_{Rn}$ of the road boundary R and respective one or more lateral positions $y_L(x_n)$ of the geometrical representation $G_1$ of the first lane marking $L_1$ having corresponding longitudinal positions $x_n$. Correspondingly, the offset approximating unit 105 may be adapted for approximating the relative lateral offset $\Delta y_{LR}$ between the geometrical representation $G_1$ of the at least first lane marking $L_1$ and the detected road boundary R, derived from one or more detected lateral positions $y_{Rn}$ of the road boundary R and respective one or more lateral positions $y_L(x_n)$ of the geometrical representation $G_1$ of the first lane marking $L_1$ having corresponding longitudinal positions $x_n$. Thus, as shown with support from at least FIGS. 1, 2A and 5, there is estimated a difference $\Delta y_{LR}$ in a lateral direction between the approximated geometrical representation $G_1$ of the at least first lane marking $L_1$ and the detected road boundary R, valid at, derived from and/or based on a lateral difference $\Delta y_{LR}(x_n)$ at at least one longitudinal position $x_n$ coinciding with the detected one or more longitudinal road boundary positions $x_n$; for instance $\Delta y_{LR}(x_2)$, $\Delta y_{LR}(x_3)$ and/or $\Delta y_{LR}(x_5)$ at respective longitudinal positions $x_2, x_3, x_5$.

Moreover, optionally, following upon optional Action 1005, approximating the relative lateral offset $\Delta y_{LR}$ may comprise approximating the relative lateral offset $\Delta y_{LR}$ between the geometrical representation $G_1$ of the at least first lane marking $L_1$ and the detected road boundary R represented by the geometrical representation 4 of the road boundary R. Correspondingly, the offset approximating unit 105 may be adapted for approximating the relative lateral offset $\Delta y_{LR}$ between the geometrical representation $G_1$ of the at least first lane marking $L_1$ and the detected road boundary R represented by the geometrical representation 4 of the road boundary R. Thus, as shown with support at least from FIGS. 1, 2B and 5, there is estimated a difference $\Delta y_{LR}$ in a lateral direction between the approximated geometrical representation $G_1$ of the at least first lane marking $L_1$ and the approximated geometrical representation 4 of the road boundary R, valid at, derived from and/or based on a lateral difference $\Delta y_{LR}(x_n)$ at at least one longitudinal position $x_n$; for instance $\Delta y_{LR}(x_2)$, $\Delta y_{LR}(x_7)$, $\Delta y_{LR}(x_8)$ and/or $\Delta y_{LR}(x_0)$ at respective longitudinal position $x_2, x_7, x_8, x_0$.

Furthermore, optionally, approximating the relative lateral offset $\Delta y_{LR}$ may comprise approximating the relative lateral offset $\Delta y_{LR}$ between the geometrical representation $G_1$ of the at least first lane marking $L_1$ and the detected road boundary R, wherein the relative lateral offset $\Delta y_{LR}$ is derived: at least partly based on a first offset value $\Delta y_{LR}(x_{n1})$, at a first longitudinal position $x_{n1}$, between a first lateral position $y_{Rn1}$ of the detected road boundary R and a corresponding first lateral position $y_L(x_{n1})$ of the geometrical representation $G_1$ of the first lane marking $L_1$; and at least partly based on at least a second offset value $\Delta y_{LR}(x_{n2})$, at at least a second longitudinal position $x_{n2}$, between at least a second lateral position $y_{Rn2}$ of the detected road boundary R and a corresponding at least second lateral position $y_L(x_{n2})$ of the geometrical representation $G_1$ of the first lane marking $L_1$. Correspondingly, the offset approximating unit 105 may be adapted for approximating the relative lateral offset $\Delta y_{LR}$ between the geometrical representation $G_1$ of the at least first lane marking $L_1$ and the detected road boundary R, wherein the relative lateral offset $\Delta y_{LR}$ is derived: at least partly based on a first offset value $\Delta y_{LR}(x_{n1})$, at a first longitudinal position $x_{n1}$, between a first lateral position $y_{Rn1}$ of the detected road boundary R and a corresponding first lateral position $y_L(x_{n1})$ of the geometrical representation $G_1$ of the first lane marking $L_1$; and at least partly based on at least a second offset value $\Delta y_{LR}(x_{n2})$, at at least a second longitudinal position $x_{n2}$, between at least a second lateral position $y_{Rn2}$ of the detected road boundary R and a corresponding at least second lateral position $y_L(x_{n2})$ of the geometrical representation $G_1$ of the first lane marking $L_1$. Thus, as shown with support at least from FIGS. 1, 2A, 2B and 5, there is estimated a difference $\Delta y_{LR}$ in a lateral direction between the approximated geometrical representation $G_1$ of the at least first lane marking $L_1$ and the detected road boundary R—and/or the approximated geometrical representation 4 of the detected road boundary R—valid at, derived from and/or based on a first offset value $\Delta y_{LR}(x_{n1})$ e.g., $\Delta y_{LR}(x_2)$ at a first longitudinal position $x_{n1}$ e.g., $x_2$ and at least a second offset $\Delta y_{LR}(x_{n1})$ e.g., $\Delta y_{LR}(x_3)$ at at least a second longitudinal position $x_{n2}$ e.g., $x_3$. That is, the approximated relative lateral offset $\Delta y_{LR}$ is valid at, derived from and/or based on two or more lateral deltas e.g., $\Delta y_{LR}(x_2)$, $\Delta y_{LR}(x_3)$, $\Delta y_{LR}(x_5)$, $\Delta y_{LR}(x_7)$, $\Delta y_{LR}(x_8)$ and/or $\Delta y_{LR}(x_0)$ between two or more lateral positions e.g., $y_L(x_2)$, $y_L(x_3)$, $y_L(x_8)$ and/or $y_L(x_0)$ of the geometrical representation $G_1$ of the at least first lane marking $L_1$ and one or more lateral position $y_R(x_2)$, $y_R(x_3)$, $y_R(x_5)$, $y_R(x_7)$, $y_R(x_8)$ and/or $y_R(x_0)$ of the detected road boundary R of the corresponding longitudinal positions $x_2$, $x_3$, $x_5$, $x_7$, $x_8$, and $x_0$, as shown in FIGS. 2A and B. The relative lateral offset $\Delta y_{LR}$ may then for instance be derived from a mean value of the first offset value $\Delta y_{LR}(x_{n1})$ and the at least second offset value $\Delta y_{LR}(x_{n2})$. Additionally or alternatively, the relative lateral offset $\Delta y_{LR}$ may then be derived from weighted values of the first offset value $\Delta y_{LR}(x_{n1})$ and/or the at least second offset value $\Delta y_{LR}(x_{n2})$.

Optionally—following upon in Action 1004 optionally detecting one or more positions $(x_n,y_{Rn})$ of a road boundary R at the first time instant $t_1$ and at the at least second time instant $t_2$—approximating the relative lateral offset $\Delta y_{LR}$ may comprise approximating the relative lateral offset $\Delta y_{LR}$ between the geometrical representation $G_1$ of the at least first lane marking $L_1$ and the detected road boundary R, wherein the relative lateral offset $\Delta y_{LR}$ is derived: at least partly based on a first relative lateral offset $\Delta y_{LR}(x_{n1})$ between the first geometrical representation $G_{11}$ of the at least first lane marking $L_1$ and the detected road boundary R derived from the first time instant $t_1$; and at least partly based on a second relative lateral offset $\Delta y_{LR}(x_{n2})$ between the second geometrical representation $G_{12}$ of the at least first lane marking $L_1$ and the detected road boundary R derived from the second time instant $t_2$. Correspondingly, the offset approximating unit 105 may be adapted for approximating the relative lateral offset $\Delta y_{LR}$ between the geometrical representation $G_1$ of the at least first lane marking $L_1$ and the detected road boundary R, wherein the relative lateral offset $\Delta y_{LR}$ is derived: at least partly based on a first relative lateral offset $\Delta y_{LR}(x_{n1})$ between the first geometrical representation $G_{11}$ of the at least first lane marking $L_1$ and the detected road boundary R derived from the first time instant $t_1$; and at least partly based on a second relative lateral offset $\Delta y_{LR}(x_{n2})$ between the second geometrical representation $G_{12}$ of the at least first lane marking $L_1$ and the detected road boundary R derived from the second time instant $t_2$. Thus, the resulting relative lateral offset $\Delta y_{LR}$ may then be derived from plural offsets $\Delta y_{LR}(x_{n1})$, $\Delta y_{LR}(x_{n2})$ derived from plural time instances $t_1$, $t_2$. For instance, the resulting relative lateral offset $\Delta y_{LR}$ may be derived from a mean value of the first relative lateral offset $\Delta y_{LR}(x_{n1})$ derived from the first time instant $t_1$ and the at least second relative lateral offset $\Delta y_{LR}(x_{n2})$ derived from the at least second time instant $t_2$. Additionally or alternatively, the relative lateral offset $\Delta y_{LR}$ may be derived from weighted values of the first relative lateral offset $\Delta y_{LR}(x_{n1})$ derived from the first time instant $t_1$ and the at least second relative lateral offset $\Delta y_{LR}(x_{n2})$ derived from the at least second time instant $t_2$.

Action 1007

In Action 1007, the boundary estimation system 1 defines the fictive outer boundary 5 of at least a section of the road 3, based on laterally shifting at least a section of the geometrical representation $G_1$ of the at least first lane marking $L_1$, the relative lateral offset $\Delta y_{LR}$. Correspondingly, the fictive boundary defining unit 106 is adapted for defining the fictive outer boundary 5 of at least a section of the road 3, based on laterally shifting at least a section of the geometrical representation $G_1$ of the at least first lane marking $L_1$, the relative lateral offset $\Delta y_{LR}$. Thus, as shown with support at least from FIGS. 3, 4A, 4B, 4C, 4D and 5, there is provided an approximation 5 of an outer boundary of the road 3 which is represented by a replica of the geometrical representation $G_1$ of the first lane marking $L_1$ and/or the geometrical representation $G_2$ of the second lane marking $L_2$, positioned offset in a lateral direction by—and/or based on—the value of the relative lateral offset $\Delta y_{LR}$. Thereby, a shape of a geometrical representation(s) $G_1$,$G_2$ of a lane marking(s) $L_1$,$L_2$ is utilized to estimate a—laterally shifted—shape of the road boundary R. Accordingly, the fictive outer boundary 5 and the geometrical representation(s) $G_1$,$G_2$ of the lane marking(s) $L_1$,$L_2$, may be represented by parallel curved and/or straight lines offset from each other the fixed value of the approximated relative lateral offset $\Delta y_{LR}$.

Action 1008

In optional Action 1008, the boundary estimation system 1 may define at least a section of the intervention path 6 based on the fictive outer boundary 5. Correspondingly, the intervention path defining unit 107 may be adapted for defining at least a section of the intervention path 6 based on the fictive outer boundary 5. Thus, as shown with support at least from FIGS. 3, 4A, 4B, 4C, 4D and 5, an intervention path 6 is provided which—rather than as commonly known being defined based on e.g., a geometrical representation $G_1$, $G_2$ of a lane marking $L_1$, $L_2$—is derived from the defined fictive outer boundary 5.

Action 1009

In optional Action 1009, the boundary estimation system 1 may assess a risk of an imminent road departure of the vehicle 2 based on comparison of a relative lateral position of the vehicle 2 to the fictive outer boundary 5. Correspondingly, the risk assessment unit may be adapted for assessing a risk of an imminent road departure of the vehicle 2 based on comparison of a relative lateral position of the vehicle 2 to the fictive outer boundary 5. Thus, as shown with support at least from FIGS. 3, 4A, 4B, 4C, 4D and 5, a risk assessment is performed which—rather than as commonly known be based on comparison of a relative lateral position of the vehicle 2 to e.g., a geometrical representation $G_1$, $G_2$ of a lane marking $L_1$, $L_2$—is based on a relative lateral position of the vehicle 2 to the defined fictive outer boundary 5.

Action 1010

In optional Action 1010, the boundary estimation system 1 may intervene in steering and/or braking of the vehicle 2 based on a proximity of a relative lateral position of the vehicle 2 to the fictive outer boundary 5. Correspondingly, the intervening unit 109 may be adapted for intervening in steering and/or braking of the vehicle 2 based on a proximity of a relative lateral position of the vehicle 2 to the fictive outer boundary 5. Thus, as shown with support at least from FIGS. 3, 4A, 4B, 4C, 4D and 5, intervention is provided which—rather than as commonly known be based on a proximity of a relative lateral position of the vehicle 2 to e.g., a geometrical representation $G_1$, $G_2$ of a lane marking $L_1$, $L_2$—is based on a proximity of a relative lateral position of the vehicle 2 to the introduced fictive outer boundary 5. Determining a proximity of a relative lateral position of the vehicle 2 to the fictive outer boundary 5 may be accomplished in any known manner. Moreover, intervention may be accomplished as commonly known in the art, for instance with support from the steering assisting system 22 and/or the braking assisting system 23.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

What is claimed is:

1. A method performed by a boundary estimation system on-board a vehicle for estimating a boundary of a road on which the vehicle is positioned, the road comprising at least a first lane marking arranged to form a straight and/or curved intermittent or continuous line on a road surface along the road, the method comprising:
   monitoring surroundings of the vehicle;
   detecting one or more positions of the at least first lane marking;
   approximating a geometrical representation of the at least first lane marking based on one or more of the detected positions of the at least first lane marking;
   detecting one or more positions of a road boundary of the road;
   approximating a relative lateral offset between the geometrical representation of the at least first lane marking and the detected road boundary; and
   defining a fictive outer boundary of at least a section of the road, based on laterally shifting at least a section of the geometrical representation of the at least first lane marking by the relative lateral offset, so that an approximation is provided of an outer boundary of the at least a section of the road which is represented by a replica of the at least a section of the geometrical representation of the at least first lane marking, positioned offset in a lateral direction based on the relative lateral offset, and so that a shape of the at least a section of the geometrical representation of the at least first lane marking is utilized to estimate a shape of the outer boundary of the at least a section of the road.

2. The method according to claim 1 wherein the approximating the relative lateral offset comprises:
   approximating a relative lateral offset between the geometrical representation of the at least first lane marking and the detected road boundary, derived from one or more detected lateral positions of the road boundary and respective one or more lateral positions of the geometrical representation of the first lane marking having corresponding longitudinal positions.

3. The method according to claim 1 further comprising:
   approximating a geometrical representation of the road boundary, based on one or more of the detected positions of the road boundary;
   wherein the approximating the relative lateral offset comprises approximating a relative lateral offset between the geometrical representation of the at least first lane marking and the detected road boundary represented by the geometrical representation of the road boundary.

4. The method according to claim 1 wherein the approximating the relative lateral offset is performed such that the relative lateral offset is derived:
   at least partly based on a first offset value at a first longitudinal position between a first lateral position of the detected road boundary and a corresponding first lateral position of the geometrical representation of the first lane marking; and
   at least partly based on at least a second offset value at at least a second longitudinal position between at least a second lateral position of the detected road boundary and a corresponding at least second lateral position of the geometrical representation of the first lane marking.

5. The method according to claim 1,
   wherein the detecting one or more positions of the at least first lane marking comprises:
      detecting one or more positions of the at least first lane marking at a first time instant and at at least a second time instant;
   wherein the approximating the geometrical representation of the at least first lane marking comprises:
      approximating a first geometrical representation of the at least first lane marking based on one or more of the positions of the at least first lane marking derived from the first time instant, and
      approximating a second geometrical representation of the at least first lane marking based on one or more of the positions of the at least first lane derived from the second time instant;
   wherein the detecting one or more positions of the road boundary comprises:
      detecting one or more positions of a road boundary at the first and at the at least second time instant;
   wherein the approximating the relative lateral offset is performed such that the relative lateral offset is derived:
      at least partly based on a first relative lateral offset between the first geometrical representation of the at least first lane marking and the detected road boundary derived from the first time instant, and
      at least partly based on a second relative lateral offset between the second geometrical representation of the at least first lane marking and the detected road boundary derived from the second time instant.

6. The method according to claim 1 further comprising:
defining at least a section of an intervention path based on the fictive outer boundary;
assessing a risk of an imminent road departure of the vehicle based on comparison of a relative lateral position of the vehicle to the fictive outer boundary; and/or
intervening in steering and/or braking of the vehicle based on a proximity of a relative lateral position of the vehicle to the fictive outer boundary.

7. A boundary estimation system adapted for use on-board a vehicle for estimating a boundary of a road on which the vehicle is positioned, the road comprising at least a first lane marking arranged to form a straight and/or curved intermittent or continuous line on a road surface along the road, the boundary estimation system comprising:
a monitoring unit adapted for monitoring surroundings of the vehicle;
a lane marking detecting unit adapted for detecting one or more positions of the at least first lane marking;
a geometrical representation approximating unit adapted for approximating a geometrical representation of the at least first lane marking based on one or more of the detected positions of the at least first lane marking;
a road boundary detecting unit adapted for detecting one or more positions of a road boundary of the road;
an offset approximating unit adapted for approximating a relative lateral offset between the geometrical representation of the at least first lane marking and the detected road boundary; and
a fictive boundary defining unit adapted for defining a fictive outer boundary of at least a section of the road, based on laterally shifting at least a section of the geometrical representation of the at least first lane marking by the relative lateral offset, so that an approximation is provided of an outer boundary of the at least a section of the road which is represented by a replica of the at least a section of the geometrical representation of the at least first lane marking, positioned offset in a lateral direction based on the relative lateral offset, and so that a shape of the at least a section of the geometrical representation of the at least first lane marking is utilized to estimate a shape of the outer boundary of the at least a section of the road.

8. The boundary estimation system according to claim 7 wherein the offset approximating unit is adapted for:
approximating a relative lateral offset between the geometrical representation of the at least first lane marking and the detected road boundary, derived from one or more detected lateral positions of the road boundary and respective one or more lateral positions of the geometrical representation of the first lane marking having corresponding longitudinal positions.

9. The boundary estimation system according to claim 7 wherein the geometrical representation approximating unit further is adapted for:
approximating a geometrical representation of the road boundary based on one or more of the detected positions of the road boundary;
wherein the offset approximating unit further is adapted for approximating a relative lateral offset between the geometrical representation of the at least first lane marking and the detected road boundary represented by the geometrical representation of the road boundary.

10. The boundary estimation system according to claim 7 wherein the offset approximating unit is adapted for approximating the relative lateral offset such that the relative lateral offset is derived:
at least partly based on a first offset value at a first longitudinal position between a first lateral position of the detected road boundary and a corresponding first lateral position of the geometrical representation of the first lane marking; and
at least partly based on at least a second offset value at at least a second longitudinal position between at least a second lateral position of the detected road boundary and a corresponding at least second lateral position of the geometrical representation of the first lane marking.

11. The boundary estimation system according to claim 7 wherein the lane marking detecting unit further is adapted for:
detecting one or more positions of the at least first lane marking at a first time instant and at at least a second time instant;
wherein the geometrical representation unit further is adapted for:
approximating a first geometrical representation of the at least first lane marking based on one or more of the positions of the at least first lane marking derived from the first time instant, and
approximating a second geometrical representation of the at least first lane marking based on one or more of the positions of the at least first lane marking derived from the second time instant;
wherein the road boundary detecting unit further is adapted for:
detecting one or more positions of a road boundary at the first time instant and at the at least second time instant;
wherein the offset approximating unit is adapted for approximating the relative lateral offset such that the relative lateral offset is derived:
at least partly based on a first relative lateral offset between the first geometrical representation of the at least first lane marking and the detected road boundary derived from the first time instant, and
at least partly based on a second relative lateral offset between the second geometrical representation of the at least first lane marking and the detected road boundary (R) derived from the second time instant.

12. The boundary estimation system according to claim 7 further comprising:
an intervention path defining unit adapted for defining at least a section of an intervention path based on the fictive outer boundary;
a risk assessment unit adapted for assessing a risk of an imminent road departure of the vehicle based on comparison of a relative lateral position of the vehicle to the fictive outer boundary; and/or
an intervening unit adapted for intervening in steering and/or braking of the vehicle based on a proximity of a relative lateral position of the vehicle to the fictive outer boundary.

13. A vehicle at least partly comprising the offset approximating unit and/or the fictive boundary defining unit of claim 7.

14. A vehicle comprising the system of claim 7.

15. A computer program product comprising a computer program including computer program code stored on a non-transient computer-readable medium and executable by a computer or a processor of a boundary estimation system on-board a vehicle to cause the boundary estimation system to:
monitor surroundings of the vehicle;
detect one or more positions of at least a first lane marking of a road on which the vehicle is positioned, wherein the at least first lane marking is arranged to form a straight and/or curved intermittent or continuous line on a road surface along the road;

approximate a geometrical representation of the at least first lane marking based on one or more of the detected positions of the at least first lane marking;

detect one or more positions of a road boundary of the road;

approximate a relative lateral offset between the geometrical representation of the at least first lane marking and the detected one or more positions of the road boundary; and define a fictive outer boundary of at least a section of the road, based on laterally shifting at least a section of the geometrical representation of the at least first lane marking by the relative lateral offset, so that an approximation is provided of an outer boundary of the at least a section of the road which is represented by a replica of the at least a section of the geometrical representation of the at least first lane marking, positioned offset in a lateral direction based on the relative lateral offset, and so that a shape of the at least a section of the geometrical representation of the at least first lane marking is utilized to estimate a shape of the outer boundary of the at least a section of the road.

* * * * *